United States Patent
Mahar et al.

(10) Patent No.: US 11,010,558 B2
(45) Date of Patent: May 18, 2021

(54) TEMPORARY SLOTS FOR STORING CHAT DATA

(71) Applicant: salesforce.com, inc., San Francisco, CA (US)

(72) Inventors: Molly Mahar, Oakland, CA (US); Jonathan Rico Morales, San Francisco, CA (US); Jacob Mumm, San Francisco, CA (US); Karson Miller, El Sobronte, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 15/885,355

(22) Filed: Jan. 31, 2018

(65) Prior Publication Data

US 2019/0236138 A1    Aug. 1, 2019

(51) Int. Cl.
*H04L 12/58* (2006.01)
*G06F 40/30* (2020.01)
*G06F 8/34* (2018.01)

(52) U.S. Cl.
CPC .............. *G06F 40/30* (2020.01); *H04L 51/02* (2013.01); *G06F 8/34* (2013.01)

(58) Field of Classification Search
CPC ....... H04L 51/02; G06F 17/243; G06F 9/453; G06F 8/34; G06F 8/38
See application file for complete search history.

(56) References Cited

U.S. PATENT DOCUMENTS

| | | | |
|---|---|---|---|
| 7,500,178 B1 * | 3/2009 | O'Donnell | G06F 17/243 707/999.01 |
| 2008/0215976 A1 * | 9/2008 | Bierner | G06F 17/243 715/708 |
| 2009/0182702 A1 * | 7/2009 | Miller | G10L 25/48 706/60 |
| 2014/0101262 A1 * | 4/2014 | Wu | H04L 51/046 709/206 |
| 2017/0048170 A1 * | 2/2017 | Smullen | H04L 67/322 |

\* cited by examiner

*Primary Examiner* — Thomas H Maung
(74) *Attorney, Agent, or Firm* — Sterne, Kessler, Goldstein & Fox P.L.L.c.

(57) ABSTRACT

This disclosure relates to configuration tools for interactive agents, sometimes referred to as bots, chatbots, virtual robots, or talkbots. Such interactive agents utilize slots for organizing and storing data received as inputs and displayed as outputs. These slots can be configured such that a slot is temporary and does not persist beyond its source dialog. Slots can also be configured such that a slot is pre-populated with information contain in incoming passed parameters.

17 Claims, 12 Drawing Sheets

TEMPORARY SLOTS FOR STORING CHAT DATA

BACKGROUND

An interactive agent, sometimes referred to as a bot, chatbot, virtual robot, talkbot, etc. is a computer program that simulates human conversation through voice commands, text messages, or both. An interactive agent can provide a convenient means for businesses to serve their customers, answer questions, and provide access to integrated back-end system functionalities. Where customers would previously navigate through menus on a webpage, send an email, call a business on the telephone, or visit in person, customers now communicate with interactive agents to more efficiently and effectively solve their problems. Where businesses would fund and maintain extensive, expensive, and potentially inefficient call centers or handle customer inquiries internally, businesses now configure interactive agents to quickly and competently handle these often repetitive tasks.

Interactive agents have become increasingly mainstreamed, occupying devices in homes and businesses, integrating with social networks, and dispersing across the Internet because they provide access to information and advanced, real-time functionality in a conversational, comfortable, familiar, and pseudo-human fashion. However, managing the interactions between interactive agents and customers requires a business to consider and configure appropriate parameters, rules, logic, variables, and structures giving life to the interactive agent.

Accordingly, a need exists to provide businesses with tools to simply and efficiently configure these interactive agents.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the arts to make and use the embodiments.

Figure 1:
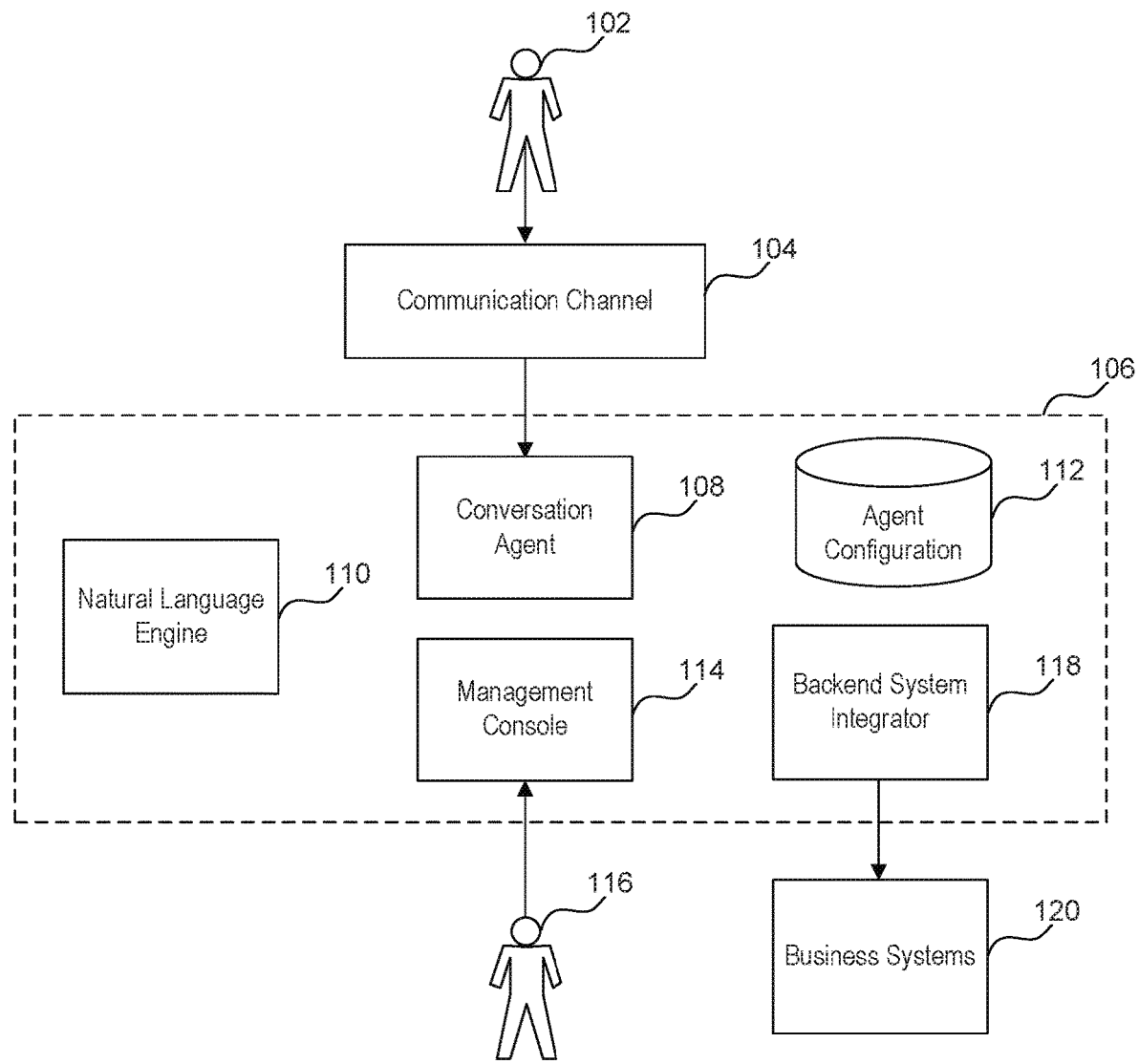
FIG. 1 is a block diagram of an interactive agent architecture, according to some embodiments.
Figure 2A:
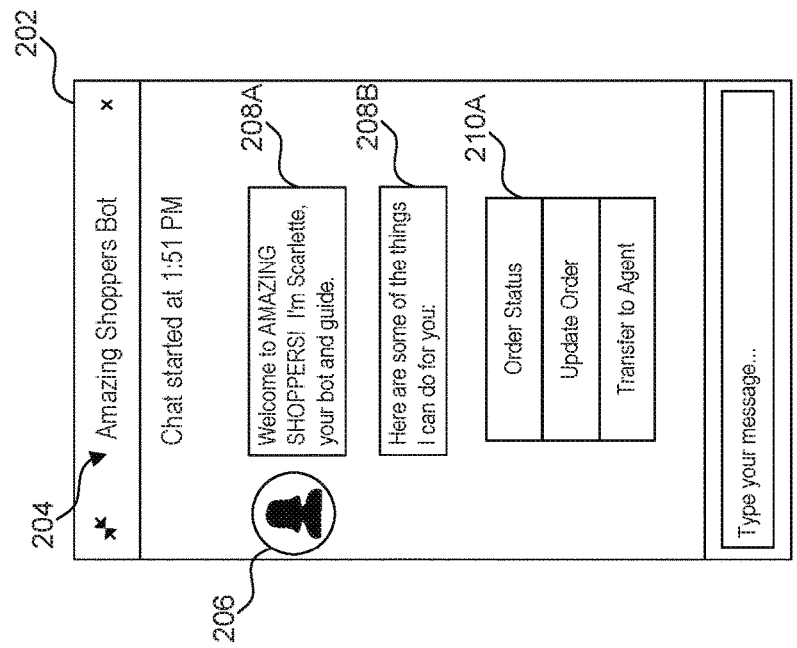
FIGS. 2A-2D are screen displays of an interactive agent interface, according to some embodiments.
Figure 2B:
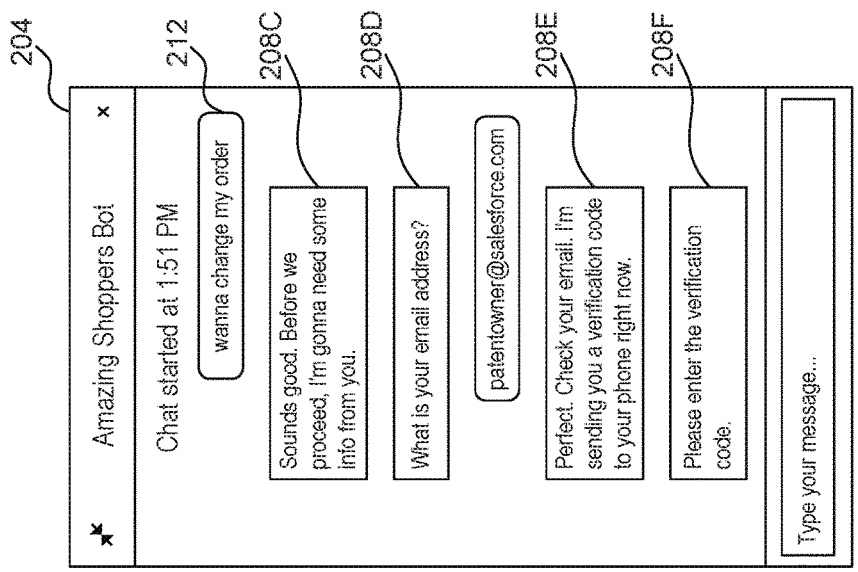
Figure 2C:
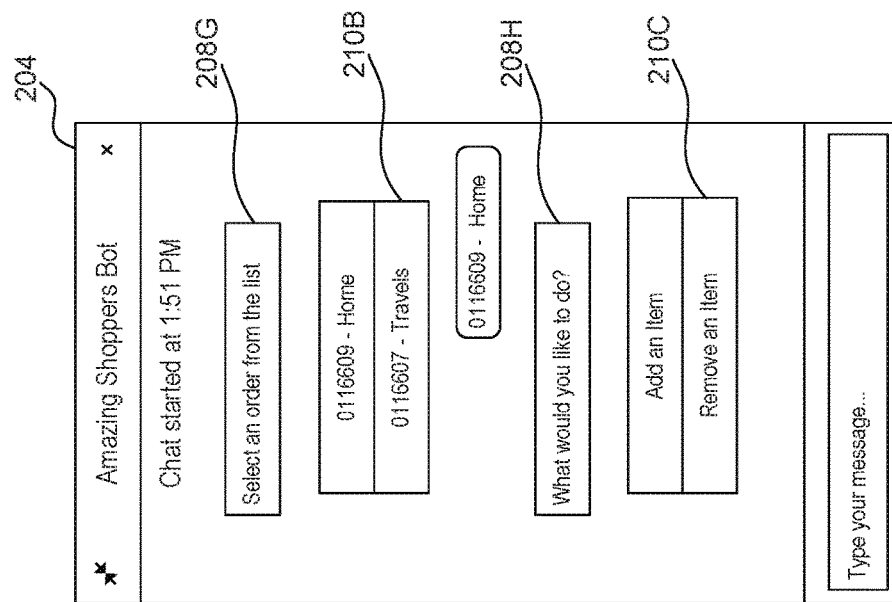
Figure 2D:
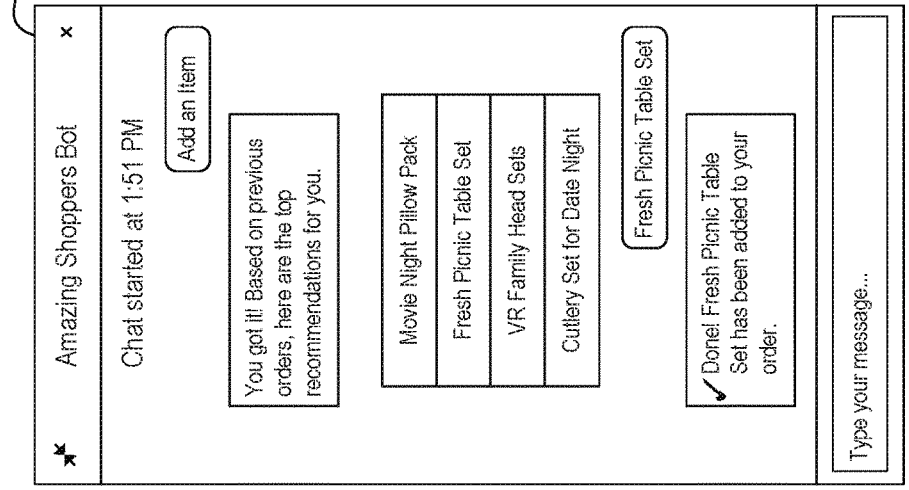

The present disclosure will be described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE INVENTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment does not necessarily include the particular feature, structure, or characteristic. Moreover, such phrases do not necessarily refer to the same exemplary embodiment. Further, when the disclosure describes a particular feature, structure, or characteristic in connection with an exemplary embodiment, those skilled in the relevant arts will know how to affect such feature, structure, or characteristic in connection with other exemplary embodiments, whether or not explicitly described.

The exemplary embodiments described herein provide illustrative examples and are not limiting. Other exemplary embodiments are possible, and modifications may be made to the exemplary embodiments within the spirit and scope of the disclosure. Therefore, the Detailed Description does not limit the disclosure. Rather, the below claims and their equivalents define the scope of the disclosure.

Hardware (e.g., circuits), firmware, software, or any combination thereof may be used to achieve the embodiments. Embodiments may also be implemented as instructions stored on a machine-readable medium and read and executed by one or more processors. A machine-readable medium includes any mechanism for storing or transmitting information in a form readable by a machine (e.g., a computing device). For example, in some embodiments a machine-readable medium includes read-only memory (ROM); random-access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, and/or instructions may be described herein as performing certain actions. However, these descriptions are merely for convenience, and these actions result from computing devices, processors, controllers, or other devices executing the firmware, software, routines, and/or instructions. Further, any implementation variations may be carried out by a general purpose computer, as described below.

Any reference to the term "module" shall be understood to include at least one of software, firmware, and hardware (such as one or more circuit, microchip, or device, or any combination thereof) or any combination thereof. In addition, those skilled in relevant arts will understand that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will fully reveal the general nature of the disclosure so that others can, by applying knowledge of those skilled in relevant arts, readily modify and/or customize for various applications such exemplary embodiments, without undue experimentation and without departing from the spirit and scope of the disclosure. Therefore, such modifications fall within the meaning and plurality of equivalents of the exemplary embodiments based upon the teaching and guidance presented herein. Here, the phraseology or terminology serves the purpose of description, not limitation, such that the terminology or phraseology of the present specification should be interpreted by those skilled in relevant arts in light of the teachings herein.

Interactive Agents

Provided herein are system, apparatus, device, method and/or computer program product embodiments, and/or combinations and sub-combinations thereof, for configuring interactive agents. An interactive agent, also known as a bot, chatbot, virtual robot, talkbot, etc., will be understood by one skilled in the relevant arts to be a simulation of human conversation through voice commands, text messages, or both. In an embodiment, an interactive agent can provide a convenient mechanism by which businesses can service customers' needs quickly and efficiently.

However, a business must design flows, dialogs, entities, slots, rules, logic, variables, and structures to empower an interactive agent to meet the business's customers' unique and varied needs. A business can build these parameters into an interactive agent configuration, which personalizes the interactive agent, indicates a scope of its available actions, and harnesses natural language processing tools including machine learning and training.

In an embodiment, a business specifies an interactive agent configuration utilizing a suitable builder, framework, tool, or interface. In an embodiment, this framework or builder is a cross-channel development tool that can deploy bots to various chat applications, e.g., Salesforce Live Agent, Facebook Messenger, Google Chat, WhatsApp, and more. In an embodiment, such a framework utilizes conversational block elements, referred to hereafter as dialogs, to configure, control, and organize interactions between an interactive agent and customers. In an embodiment, a dialog is a cluster of actions that the interactive agent can perform and may include slots for storing data. A dialog may use predetermined messages, text, audio, etc. that the interactive agent sends to the customer during their conversation. The dialog may also specify inputs to be received from a customer, any back-end verifications, processes, or programs to integrate, any data to be retrieved from resources available to the interactive agent through an API, and any other suitable functionalities to further support the interactions between an interactive agent and customers.

For instance, if a clothing retailer provides customer service using an interactive agent, the retailer would build dialogs unique to the retail industry. One exemplary dialog could be a dialog to receive and process a customer's order. In this example, the dialog could consist of messages directed to the customer, e.g., "Hello, welcome to the store. How can I help you today?" The dialog could also anticipate input from the user, e.g., "What would you like to buy today? (1) shoes; (2) hats; (3) shirts;" and then receive and recognize the customer's response to the question. The dialog could subsequently interact with the invoicing system, placing the specific order once verified by the customer. Another dialog could retrieve past orders from an internal billing system, display the orders for customers in a coherent fashion, allow searching, answer questions about past orders, etc.

In an embodiment, an interactive-agent framework also organizes dialogs into flows. In such an embodiment, a flow could represent a series of one or more dialogs to execute in a particular order. Continuing the exemplary retailer example, a flow could represent a sequence of dialogs unique to the retail industry that the customer can undertake upon launching the interactive agent. For instance, the customer could check an order status, then update the order or cancel it, etc., and then exit the interactive agent. These dialogs, each consisting of one or more actions, would all be considered part of a single flow, and the transitions between the dialogs would need to be configured.

In an embodiment, an interactive-agent framework could also allow for non-sequential dialog transitions via intent recognition. In this embodiment, at the completion of a dialog, the interactive agent configuration would specify that the interactive agent should wait for appropriate customer input before proceeding onto the next dialog. The framework would then utilize a natural language engine to recognize the customer's intent and trigger the correct dialog, without configuring a specific order, or flow, to the dialogs. A full interactive agent configuration could use a combination of these two methods, prescribed flows and intent recognition, for directing the customer to the correct dialogs in the interactive agent.

Dialogs use slots to store calculated data and data received as input. A slot serves as a variable or storage mechanism through which the interact agent preserves the inputs received for later usage. A slot can store customer input or provide output back to the customer. For example, to continue the clothing-retailer example above, the customer could select to buy "shirts" and then subsequently be asked to enter their shirt size. Later, when confirming the purchase, the interactive agent would not have to ask again for the shirt size because this information could be stored in a slot. Perhaps the interactive agent could display or output the shirt size previously entered, asking the customer to verify it. Or instead, the interactive agent could just enter the purchase order with prior knowledge of the customer's shirt size.

A permanent slot persists past the termination of its calling dialog. For example, if a dialog that checks an order status contained a permanent slot, the slot's value would remain the same in a later dialog that cancels the order. However, if the slot was temporary, the slot would no longer be available for recall by the later dialog. In other words, the dialog's scope would be transient, persisting only while the original dialog remained in execution.

When a slot is permanent, name conflicts can arise in later-called dialogs, lithe permanent slot should change between dialogs, then the dialog slot would need to be created twice with different names in order to achieve the desired functionality, perhaps using numbers in the name or another naming convention. For example, if a shoe-buying dialog receives a quantity-ordered from a customer, this value should be cleared for a later shirt-buying dialog. The configuring agent would possibly have to name one slot Quantity_Ordered1 and a second slot Quantity_Ordered2. However, this problem can be avoided by making the slot a temporary slot.

In some embodiments, the slots can also be associated with information that may already be available through the parameters passed in from a referrer. For example, a particular messaging tool from which the interactive agent is launched may already know the first name of the customer. Accordingly, there is no need to re-query the customer regarding their first name. Instead, this information can be garnered from parameters passed to the interactive agent.

One skilled in the relevant arts will appreciate that building appropriate dialogs and slots can be a time-consuming, resource-intensive process. One effective tool to simplify these tasks is to provide a temporary flag and a passed-parameter flag for slots. These features will now be discussed with respect to the corresponding figures.

FIG. 1 is a block diagram of an interactive agent architecture 100, according to some embodiments. Interactive agent architecture 100 may include customer 102, communication channel 104, interactive agent 106, conversation agent 108, natural language engine 110, agent configuration 112, management console 114, business agent 116, backend system integrator 118, and business systems 120.

In an embodiment, customer 102 uses communication channel 104 to interface with interactive agent 106. Customer 102 can be an individual (i.e., a human being) or group of such individuals. In an embodiment, customer 102 interacts with interactive agent 106 in order to accomplish a task, gather information, or complete other goals. For example, customer 102 could aim to order a pizza from a pizzeria, receive suggestions about particular goods or services from a retailer, obtain customer support for a technical problem, view a weather forecast on a home device, hear the news, schedule a meeting, make travel plans, receive a restaurant recommendation, or any other of a myriad of suitable tasks.

Communication channel 104 provides a method by which a human can interact with interactive agent 106. In an embodiment, communications between customer 102 and interactive agent 106 via communication channel 104 can be text-based, speech- or sound-based, or occur in any other suitable communication medium. For example, communication channel 104 could be Messenger, Slack, Chatterbox, WhatsApp, Email, Skype, etc. Communication channel 104 could transpire through verbal exchanges instead of text messages, for example, in speaking interactions with Alexa, Google Home, HomePod, etc. Communication channel 104 can exchange packets with interactive agent 106 via a network, which includes any or all of a LAN, WAN, the Internet, or other public network, or communication channel 104 and interactive agent 106 coexist on or within the same device or workstation.

Interactive agent 106 may include conversation agent 108, natural language engine 110, agent configuration 112, management console 114, and backend system integrator 118. Such an embodiment of interactive agent 106 provides efficiency advantages to a business over conventional methods of processing customer requests/questions, such as utilizing a call center or other form of human labor or intelligence. Interactive agent 106 advances a paradigm of human-computer interaction utilizing natural language, pre-scripted flows, and tailored dialogs.

Conversation agent 108 is a bot, chatbot, virtual robot, talkbot, etc. that simulates human conversation through voice, text, other form of suitable communication, or a combination thereof. In exemplary embodiments, conversation agent 108 can service customers' inquiries, answer customers' questions, and address customer needs. Conversation agent 108 may respond to customers using pre-defined text strings, ask relevant questions, collect data from associated data sources seamlessly, run scripts or executables, and transition customers through or among the dialogs.

In an embodiment, an interactive agent 106 utilizes natural language engine 110, which leverages natural language processing to decipher and interpret text or speech received from customer 102 via communication channel 104. One skilled in the arts will understand that such natural language processing aims to determine the intent or intents of the customers. Machine learning and machine training can be harnessed to better understand and gauge customers' intents over time.

Agent configuration 112 stores a description of the behaviors and functionalities available to conversation agent 108. In an embodiment, agent configuration 112 stores natural language parameters, flows, rules, logic, scripts, slots, dialogs, and variables that guide the behavior of interactive agent 106.

In an embodiment, management console 114 provides a mechanism to facilitate the configuration, design, implementation, and release of interactive agent 106 and to update agent configuration 112. Management console 114 can provide a visualization of interactive agent 106 and agent configuration 112. In an embodiment, management console 114 can include one or more servers processing web-based traffic and HTTP or HTTPS request methods as received from a web browser on a mobile device or computer workstation. In an embodiment, management console 114 serves appropriate HTML web pages or other suitable viewable format to business agent 116. Business agent 116 can be an owner, employee, agent of, representative of, etc. of any business, company, individual, etc. that deploys interactive agent 106. In an embodiment, business agent 116 is not affiliated with any business, but rather is an individual acting in an individual capacity and could also be a group of individuals collaborating.

Backend system integrator 118 interacts with any relevant business systems 120 in order to provide additional functionality to interactive agent 106. For example, relevant business systems 120 could be ordering, invoice, shipping, or personnel systems, or any other suitable system. In an embodiment, backend system integrator 118 could interact with relevant business systems 120 using an application programming interface or other subroutine definition or protocol. This integration can occur seamlessly and quickly from the perspective of customer 102 and occurs as part of customer 102's interactions with interactive agent 106.

FIGS. 2A-2D are screen displays of interactive agent interface 200, according to some embodiments. Interface 200 may reflect a specific instance of conversation agent 108 described above in FIG. 1. In an embodiment, interface 200 may include: window 202, title 204, avatar 206, dialogs 208, suggested input options 210, and text input 212. For exemplary purposes, FIGS. 2A-2D reflect an "Amazing Shoppers Bot," however, this is just one exemplary embodiment. Interactive agent 106 could service any number of a myriad of subjects, customers, businesses, etc.

In an embodiment, window 202 frames messages transmitted in SMS, MMS, or other suitable format. In an alternative embodiment, window 202 receives voice messages, employs speech recognition software, and verbally relays the contents of window 202. In an embodiment, window 202 displays title 204, avatar 206, dialogs 208, suggested input options 210, and text input 212. Title 204 describes the subject matter addressed by interactive agent 106. Avatar 206 can be a logo, picture, photo, or other visual representation of the personality of interactive agent 106.

Dialogs 208 are the conversational block elements that guide, frame, describe, and coordinate interactions between interactive agent 106 and customer 102. Dialogs 208 may include textual or verbal messages that conversation agent 108 outputs to customer 102. Dialogs 208 may also specify inputs to be received from customer 102, back-end verifications, processes, or programs to integrate, any data to be retrieved from resources available to the interactive agent through an API, and any other suitable functionalities to customer 102.

Suggested input options 210 and text input 212 can be information received from customer 102. Suggested input options 210 can be any of a number of forms of input such as a checkbox, radio button, multi select, yes/no, etc. Input can also be received as text, strings, or other character data as text input 212. In processing text input 212, interactive agent 106 can apply natural language processing to ascertain the intents of customer 102 across a variety of lingual constructs, grammatical forms, sentence structures, etc.

Figure 3:
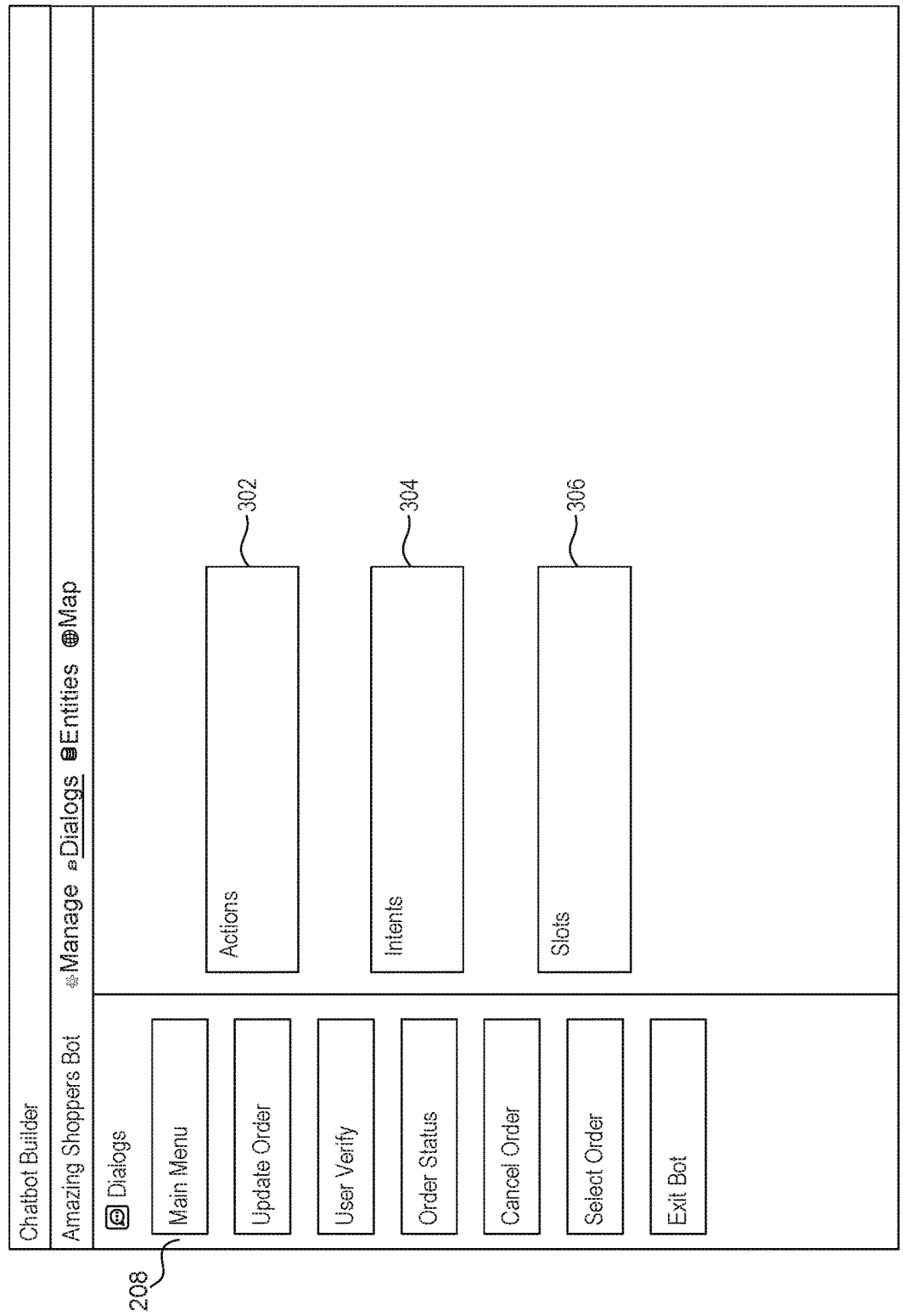
FIG. 3 is a screen display of an interactive agent configuration tool, according to some embodiments.

FIG. 3 is a screen display of an interactive agent configuration tool 300, according to some embodiments. Interactive agent configuration tool 300 may include: actions 302, intents 304, and slots 306, as well as a description or listing of dialogs 208 described above in FIG. 2.

Actions 302 are configured by business agent 116 via a configuration tool 300. Actions 302 specify the behavior of interactive agent 106. In an embodiment, actions 302 are responses or messages in the form of pre-written text or character strings, questions that interactive agent 106 should ask also in textual form, scripts and executables to run, and other process rules. Actions 302 further describe the relationships between dialogs 208, provide an indication of the order in which dialogs 208 and actions 302 transpire, and the flow that interactive agent 106 transitions through.

Intents 304 are activities that a given customer 102 aims to accomplish. Intents 304 feed into natural language engine 110 and utilize natural language processing to garner intents 304 from text, voice, and other inputs passed through communication channel 104.

Slots 306 can be inputs received from a customer or outputs by interactive agent 106 displayed for a customer. In an embodiment, slots 306 could provide a link to a slot configuration screen and configuration tool such as that described below in relation to FIG. 4.

Figure 4:
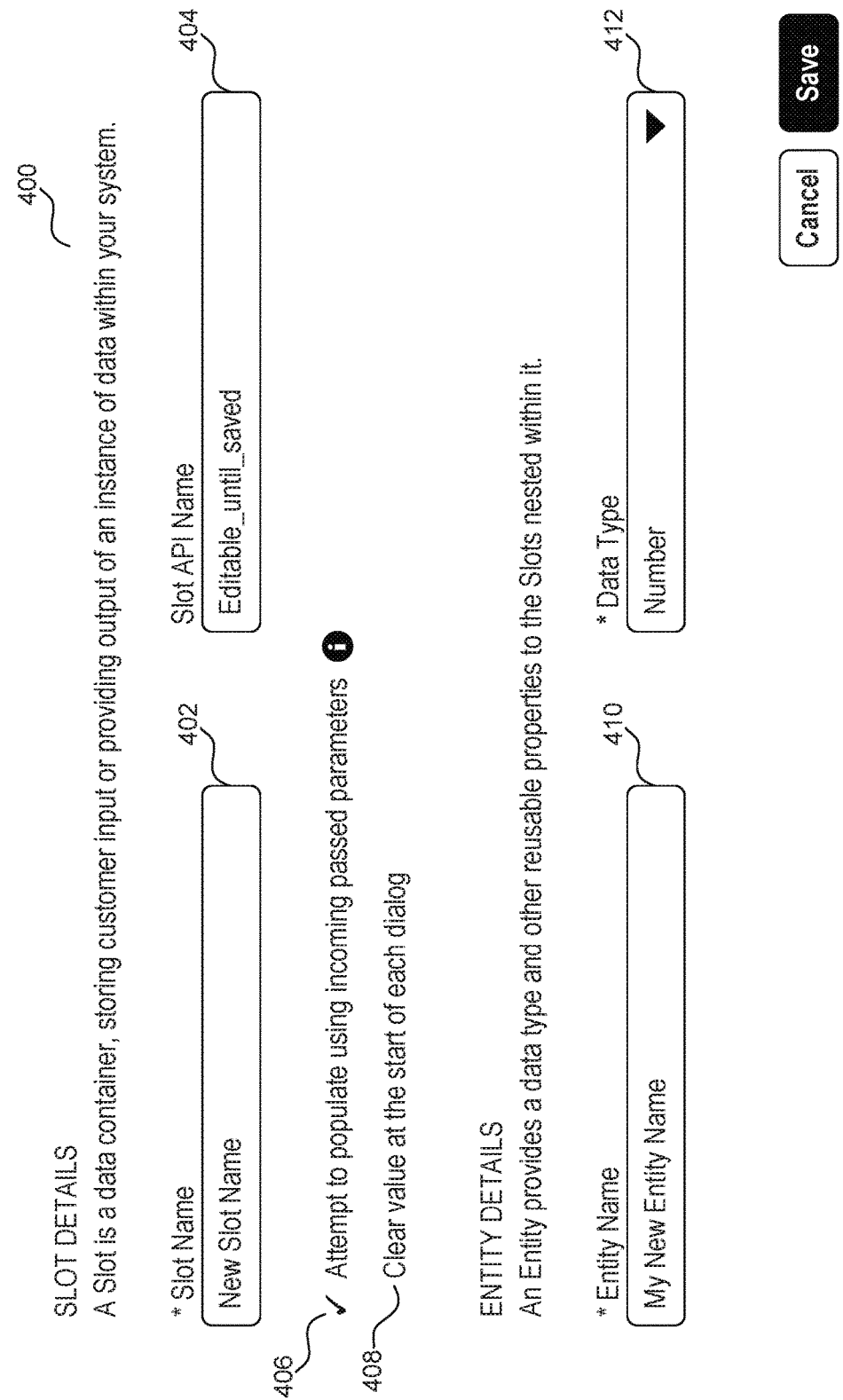
FIG. 4 is a screen display of a slot creation tool, according to some embodiments.

FIG. 4 is a screen display of a slot creation tool 400, according to some embodiments. Slot configuration tool 400 may include: slot name 402, slot API name 404, passed-parameters flag 406, temporary flag 408, entity name 410, and data type 412.

Slot name 402 provides the ability for a user, such as business agent 116, to enter a name for the slot. In an embodiment, slot name is unique to each slot in slots 306; no two slots 306 within each dialogs 208 can share the exact name. Slot API name 404 provides an API name to be utilized when populating the slot from incoming passed parameters and to differentiate each slot when used by the Backend System integrator 118. Each Slot API name 404 likewise will be unique to each bot.

Passed-parameters flag 406 and temporary flag 408 provide mechanisms by which to set particularized properties of slots 306. Passed-parameters flag 406, when set, will trigger the passed-parameters functionality described below in FIGS. 7-8. Temporary flag 408, when set, will trigger the temporary-slots functionality described below in FIGS. 5-6.

Entity name 410 and data type 412 provide a name and data type for an entity. An entity is configuration aid in interactive agent configuration tool 300. In an example embodiment, an entity name could recognize a string, e.g., a product name, when entered by a customer. Business agent 116 could configure those entities which could be recognized by natural language engine 110. Entity name 410 could fill associated slots 306 automatically. In an embodiment, entities are only used for recognizing inputs and are not outputted to customer 102.

Temporary Slots for Storing Chat Data

Slots 306 can be temporary or permanent. Slots 306 that are permanent persist outside the lifetime of their source dialogs, remaining available in later dialogs. Slots 306 that are temporary do not persist past the termination of their source dialogs. When slots 306 are permanent, a larger number of slots would need to be created to capture similar information from the customer 102 and name conflicts might arise with similar slots 306 in subsequent dialogs. For example, if a slot capturing later-used information should clear between dialogs, then two different slots may need to be created in order to achieve this functionality. However, this duplication can be avoided with the use of temporary slots.

Figure 5:
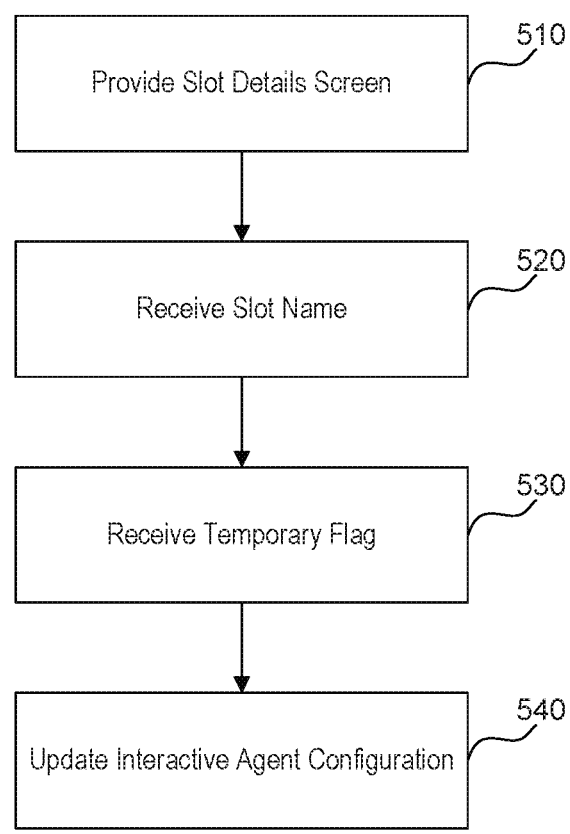
FIG. 5 is a flowchart illustrating a process for adding a new slot to a dialog with a temporary flag, according to some embodiments.

FIG. 5 is a flowchart illustrating a method 500 for adding a new slot to a dialog with a temporary flag, according to some embodiments.

In 510, method 500 provides a slot details screen to a configuring user. In an embodiment, the details can be similar to those described in slot creation tool 400 displayed in FIG. 4. 510 provides a mechanism by which the information required for the creation of the slot can be gathered from a user, such as business agent 116.

In 520, interactive agent configuration tool 300 receives slot API name 404 for the new slot being created. In an embodiment, each slot API name 404 is unique within a bot.

In 530, interactive agent configuration tool 300 receives an indicator of temporary flag 408 for the slot being created. In an embodiment, temporary flag 408 is a Boolean value; it can be either true or false. If true, then the slot will not persist outside of its source dialog. If false, the slot value will persist throughout the entirety of the execution of interaction agent 106.

In 540, method 500 updates agent configuration 112 with appropriate information about the slot. 540 configures the appropriate parameters, including an indicator of temporary flag 408 received in 530.

Figure 6:
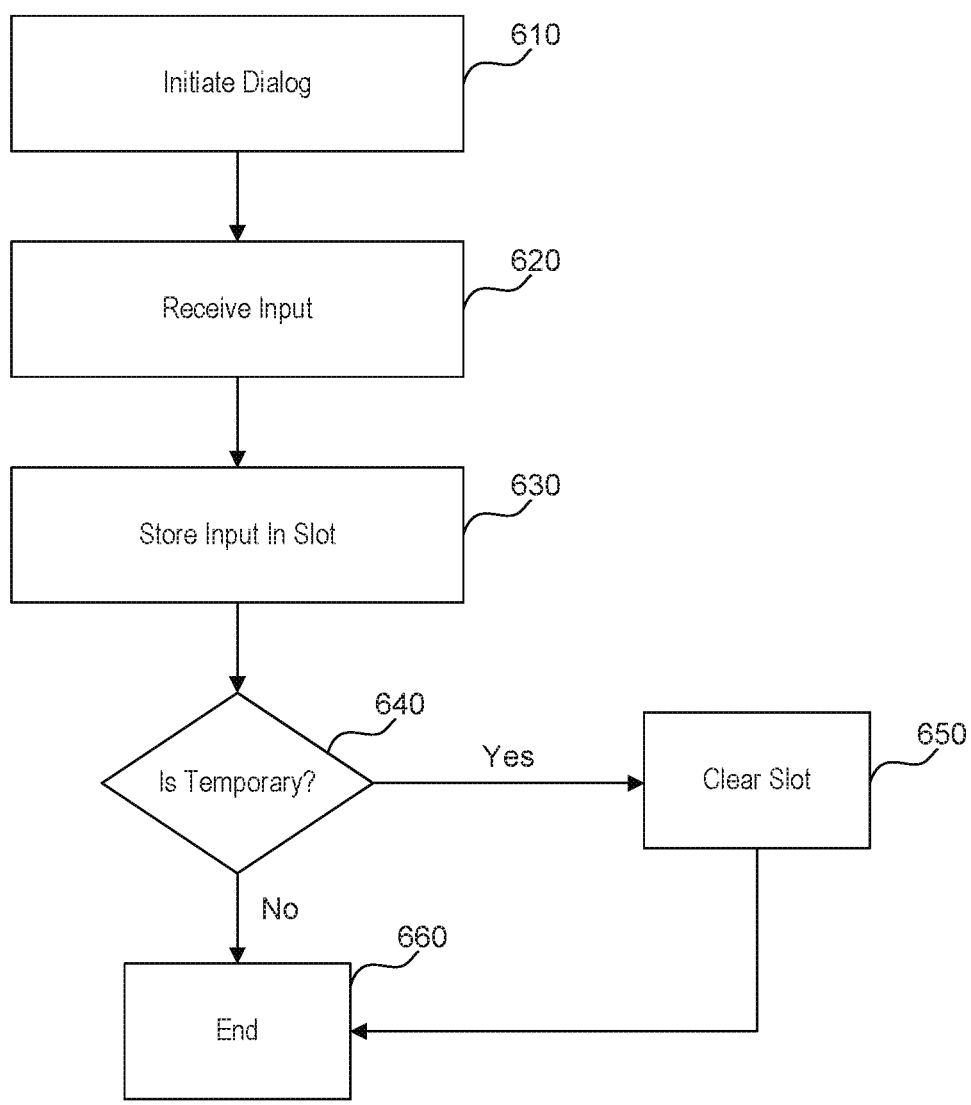
FIG. 6 is a flowchart illustrating a process for executing a dialog with a slot having a temporary flag, according to some embodiments.

FIG. 6 is a flowchart illustrating a method 600 for executing a dialog with a slot having a temporary flag, according to some embodiments. FIG. 6 will be described below by way of example, returning to the exemplary dialog that receives and processes a customer's order described above. In this exemplary dialog, one slot may be configured with slot name 402 of Customer_Order to receive the response to the question: "What would you like to buy today? (1) shoes; (2) hats; (3) shirts." A second slot could be configured with slot name 402 of Customer_Name to store the customer's name.

In 610, a dialog initiates, such as dialogs 208. Dialogs 208 may have one or more slots 306 configured. Moreover, as described with respect to FIG. 5, a slot in slots 300 may have a temporary flag set. For example, the Customer_Order, which receives the item that the customer wants to buy could be configured to have temporary flag 408 set. However, the Customer_Name slot storing the customer's name could be configured to not have temporary flag 408 set, i.e., be a permanent slot.

In 620, method 600 receives an input from a customer, and in 630, method 600 stores this input in a slot. The input could be the user's response to the question: "What would you like to buy today? (1) shoes; (2) hats; (3) shirts." Or the customer could provide their First Name as input. In an embodiment, the customer's name could be derived from incoming passed parameters as detailed below in the description of FIG. 8. In an alternate embodiment, slots 306 store information calculated in ancillary or back-end processes to display as output to the customer.

In 640, interactive agent configuration tool 300 checks if temporary flag 408 is set. This is a conditional statement. If temporary flag 408 is set, then method 600 proceeds to 650. If temporary flag 408 is not set, then method 600 proceeds to 660.

In 650, method 600 clears the value in the slot. In an embodiment, 650 occurs upon completion of the dialog. For the above example, the value received and stored in the Customer_Order slot would be cleared out because the temporary flag was set for the slot. Subsequently executing dialogs could utilize a slot named Customer_Order knowing the that slot would not be wrongly include information from a prior dialog's Customer_Order slot. Users could avoid ensuring uniqueness of the name through the use of numerals or other complicated naming conventions. In 660, the dialog completes.

Incoming Passed Parameters Property

In some embodiments, interactive agent 106 receives data corresponding to slots 306 as parameters passed in from a referrer. In an embodiment, this information can be assigned to appropriate slots 306 by matching the name of the incoming parameter with similarly named slots for which passed-parameters flag 406 is set. This eliminates the need to ask customers for information that is already known.

Figure 7:
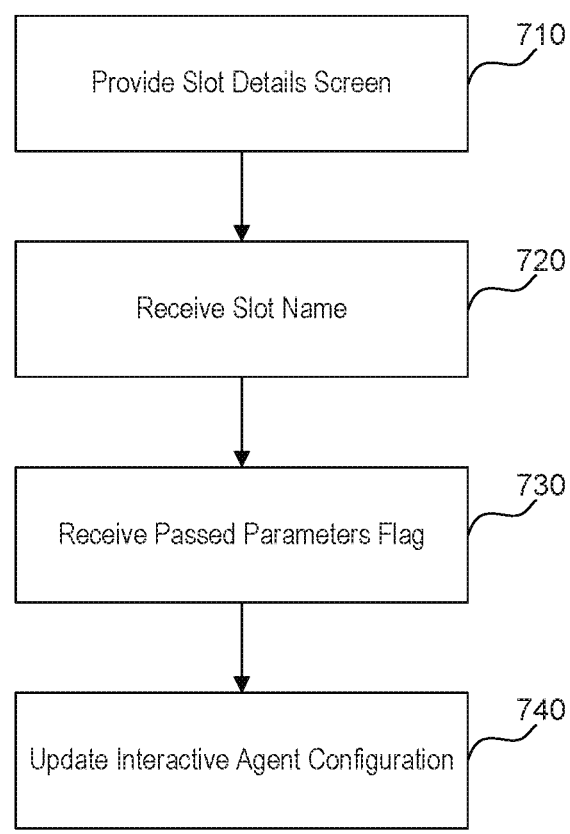
FIG. 7 is a flowchart illustrating a process for adding a new slot to a dialog with an incoming passed parameters flag, according to some embodiments.

FIG. 7 is a flowchart illustrating a method 700 for adding a new slot to a dialog with a passed-parameters flag, according to some embodiments.

In 710, method 700 provides a slot details screen to a user configuring interactive agent 106 via management console 114. In an embodiment, the details are similar to those described in slot creation tool 400 displayed in FIG. 4. 710 provides a mechanism by which the information required for the creation of the slot can be gathered from business agent 116.

In 720, interactive agent configuration tool 300 receives a slot name for the new slot. This slot name can be string, text, numerical, or any other suitable data type.

In 730, interactive agent configuration tool 300 receives an indication of the passed-parameters flag 406. In an embodiment, passed-parameters flag 406 is a Boolean value; it can be either true or false. If true, then the slot will attempt to populate automatically based on incoming passed parameters. If false, the slot value will be initialized to be null.

In 740, method 700 updates agent configuration 112 with the new slot. 740 configures the appropriate parameters, including an indicator of passed-parameters flag 406 received in 730.

Figure 8:
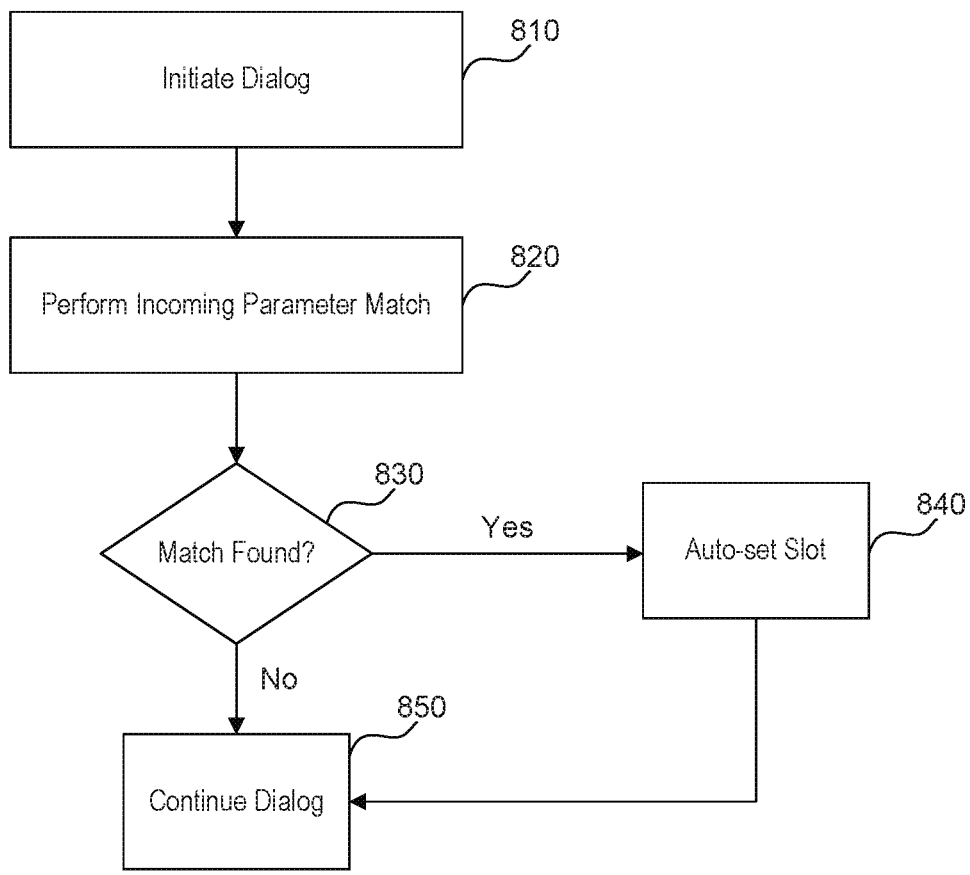
FIG. 8 is a flowchart illustrating a process for executing a dialog with a slot having an incoming passed parameters flag, according to some embodiments.

FIG. 8 is a flowchart illustrating a method 800 for executing a dialog with a slot having passed-parameters flag 406, according to some embodiments. FIG. 8 will be described below, returning to the exemplary dialog that receives and processes a customer's order described above. In this exemplary dialog, one slot named Customer_Order may be configured to receive the response to the question: "What would you like to buy today? (1) shoes; (2) hats; (3) shirts," and a second slot named Customer_Name could be configured to store the customer's name.

In 810, a particular dialog of dialogs 208 initiates or commences. Dialogs 208 may have one or more slots 306 configured. Moreover, as described with respect to FIG. 7, a slot in slots 300 may have passed-parameters flag 406 set or not set. To continue with the example, the Customer_Order slot, which receives the customer's buying interest, could be configured to not have passed-parameters flag 406 set while the Customer_Name slot storing the customer's name could be configured to have passed-parameters flag 406 set.

In 820, method 800 examines slots 300 with passed-parameters flag 406 enabled. Method 800 may ignore slots 300 that do not have passed-parameters flag 406 enabled. In the above example, 820 examines only the Customer_Name. The Customer_Order slot is not examined. 820 performs an incoming parameter match, comparing each of the incoming parameters by name to any slot name 402 with passed-parameters flag 406 enabled. For the Customer_Name slot, an incoming parameter matching that string would be sought.

In 830, checks if a match occurred in 820. A match occurs when 820 matches at least one incoming parameter by name to any slot name 402 with passed-parameters flag 406 enabled. This is a conditional statement. If 830 finds a match, then method 800 proceeds to 840. If 830 does not find a match, then method 800 proceeds to 850.

In 840, method 800 pre-populates the slots for which a match was found with the value passed in with the incoming passed parameter. Returning to the above example, if a referred parameter arrived as "Customer_Name=Walter", then the Customer_Name slot would be pre-populated with "Walter."

In 850, the dialog proceeds with any slot values automatically pre-populated where configured and a valid match was found in the incoming parameters. Thus, the dialog would not query the customer for their name where the name was known by the referrer, but could instead greet them immediately with their name. For instance, interactive agent 106 could greet the customer, "Hello Walter! Welcome to the Amazing Shopper's Bot!"

Figure 9:
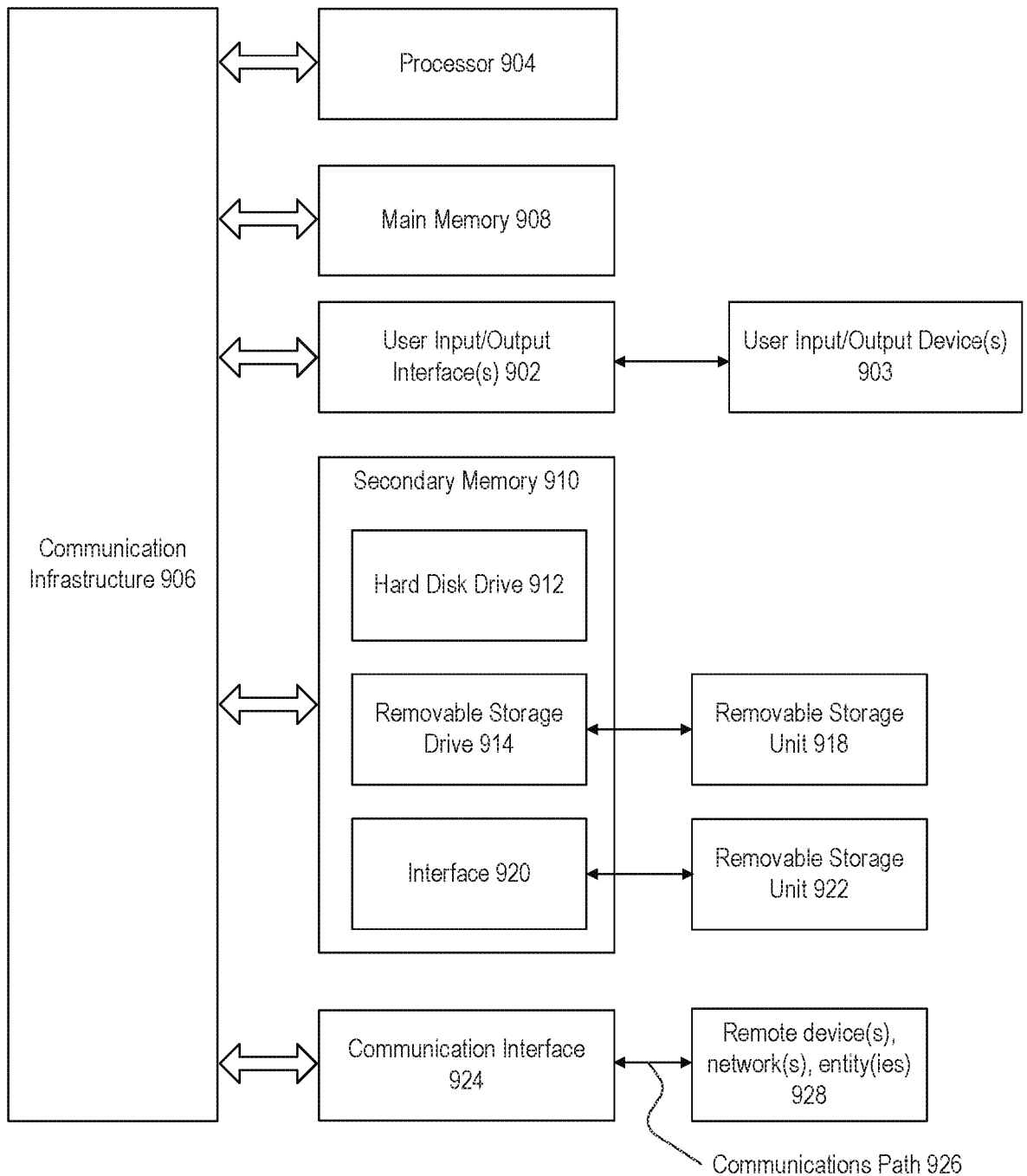
FIG. 9 illustrates a computer system, according to exemplary embodiments of the present disclosure.

Various embodiments may be implemented, for example, using one or more well-known computer systems, such as computer system 900 shown in FIG. 9. One or more computer systems 900 may be used, for example, to implement any of the embodiments discussed herein, as well as combinations and sub-combinations thereof.

Computer system 900 may include one or more processors (also called central processing units, or CPUs), such as a processor 904. Processor 904 may be connected to a communication infrastructure or bus 906.

Computer system 900 may also include user input/output device(s) 903, such as monitors, keyboards, pointing devices, etc., which may communicate with communication infrastructure 906 through user input/output interface(s) 902.

One or more of processors 904 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 may also include a main or primary memory 908, such as random access memory (RAM). Main memory 908 may include one or more levels of cache. Main memory 908 may have stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 may include a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 may read from and/or write to removable storage unit 918.

Secondary memory 910 may include other means, devices, components, instrumentalities or other approaches for allowing computer programs and/or other instructions and/or data to be accessed by computer system 900. Such means, devices, components, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 may enable computer system 900 to communicate and interact with any combination of external devices, external networks, external entities, etc. (individually and collectively referenced by reference number 928). For example, communication interface 924 may allow computer system 900 to communicate with external or remote devices 928 over communications path 926, which may be wired and/or wireless (or a combination thereof), and which may include any combination of LANs, WANs, the Internet, etc. Control logic and/or data may be transmitted to and from computer system 900 via communication path 926.

Computer system 900 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 900 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 900 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
   receiving, by one or more processors, a request to launch an interactive agent from a chat application from which the interactive agent is launched;
   retrieving, by the one or more processors, an interactive agent configuration comprising a plurality of slots, a plurality of dialogs, and a slot definition for each slot in the plurality of slots, wherein each slot in the plurality of slots is configured to store an input value received from a user during a conversation, and wherein the slot definition comprises a passed parameters flag and a temporary flag, wherein each dialog of the plurality of dialogs specifies actions that the interactive agent performs in the conversation with the user, wherein the actions indicate an order for transitioning through the plurality of dialogs, wherein each slot in the plurality of slots stores data received from the user, and wherein the interactive agent configuration is specified in an interactive agent configuration tool;
   performing, by the one or more processors, an incoming parameter match on parameters passed by a referrer when the passed parameters flag indicates that the incoming parameter match should be performed, wherein the incoming parameter match compares the slot to a parameter name in the parameters, determines a matched value associated with the parameter name, and initializes the value to the matched value when the matched value is determined;
   deploying, by the one or more processors, a first interactive agent to the chat application that presents a first dialog in the plurality of dialogs in the conversation, wherein the first dialog in the plurality of dialogs is determined using a natural language engine that recognizes a user's intent in text entered in the chat application, and wherein the first interactive agent displays the matched value when the matched value is determined;
   obtaining, by the one or more processors, an input value from the user in response to the first dialog;
   storing the input value in the slot;
   determining whether the temporary flag associated with the slot is set; and
   upon completion of the first dialog, deploying a second interactive agent to the chat application that presents a second dialog in a second conversation with the user, wherein an availability of the stored input value in the second conversation is based on a determination of whether the temporary flag associated with the slot is set or not set, wherein the passed parameters flag and the temporary flag are set using checkboxes presented in the interactive agent configuration tool prior to deploying the chat application.

2. The method of claim 1, further comprising:
   receiving, by the one or more processors, an updated-value as text; and
   applying, by the one or more processors, natural language processing to the updated value; and
   storing, by the one or more processors, the updated value in the slot.

3. The method of claim 1, further comprising:
   storing, by the one or more processors, a set of mutually exclusive options for the slot; and
   receiving, by the one or more processors, an updated value using a graphical control element that allows selection of one of the mutually exclusive options; and
   storing, by the one or more processors, the updated value in the slot.

4. The method of claim 1, wherein the request is a hypertext transfer protocol (HTTP) request.

5. The method of claim 1, wherein the referrer is the second interactive agent.

6. The method of claim 1, further comprising:
   clearing, by the one or more processors, the input value before deploying the second interactive agent that presents a second dialog to the user when the temporary flag associated with the slot is set.

7. A system, comprising:
   a memory; and
   at least one processor coupled to the memory and configured to:
   receive a request to launch an interactive agent from a chat application from which the interactive agent is launched;
   retrieve an interactive agent configuration comprising a plurality of slots, a plurality of dialogs, and a slot definition for each slot in the plurality of slots, wherein each slot in the plurality of slots is configured to store an input value received from a user during a conversation, and wherein the slot definition comprises a passed parameters flag and a temporary flag, wherein each dialog of the plurality of dialogs specifies actions that the interactive agent performs in the conversation with the user, wherein the actions indicate an order for transitioning through the plurality of dialogs, wherein each slot in the plurality of slots stores data received from the user, and wherein the interactive agent configuration is specified in an interactive agent configuration tool;
   perform an incoming parameter match on parameters passed by a referrer when the passed parameters flag indicates that the incoming parameter match should be performed, wherein the incoming parameter match compares the slot to a parameter name in the parameters, determines a matched value associated with the parameter name, and initializes the input value to the matched value when the matched value is determined;
   deploy a first interactive agent to the chat application that presents a first dialog in the plurality of dialogs in the conversation, wherein the first dialog in the plurality of dialogs is determined using a natural language engine that recognizes a user's intent in text entered in the chat application, and wherein the first interactive agent displays the matched value when the matched value is determined;
   obtain an input value from the user in response to the first dialog;
   store the input value in the slot;
   determine whether the temporary flag associated with the slot is set; and upon completion of the first dialog, deploy a second interactive agent to the chat application that presents a second dialog in a second conversation with the user, wherein an availability of the stored input value in the second conversation is based on a determination of whether the temporary flag associated with the slot is set or not set, wherein the passed parameters flag and the temporary flag are set using checkboxes presented in the interactive agent configuration tool prior to deploying the chat application.

8. The system of claim 7, the at least one processor further configured to:
receive an updated value as text;
apply natural language processing to the updated value; and
store the updated value in the slot.

9. The system of claim 7, the at least one processor further configured to:
store a set of mutually exclusive options for the slot;
receive an updated value using a graphical control element that allows selection of one of the mutually exclusive options; and
store the updated value in the slot.

10. The system of claim 7, wherein the request is a hypertext transfer protocol (HTTP) request.

11. The system of claim 7, wherein the referrer is the second interactive agent.

12. The system of claim 7, the at least one processor further configured to:
clear the input value before deploying the second interactive agent that presents a second dialog to the user when the temporary flag associated with the slot is set.

13. A non-transitory computer-readable device having instructions stored thereon that, when executed by at least one computing device, causes the at least one computing device to perform operations comprising:
receiving a request to launch an interactive agent from a chat application from which the interactive agent is launched;
retrieving an interactive agent configuration comprising a plurality of slots, a plurality of dialogs, and a slot definition for each slot in the plurality of slots, wherein each slot in the plurality of slots is configured to store an input value received from a user during a conversation, and wherein the slot definition comprises a passed parameters flag and a temporary flag, wherein each dialog of the plurality of dialogs specifies actions that the interactive agent performs in the conversation with the user, wherein the actions indicate an order for transitioning through the plurality of dialogs, wherein each slot in the plurality of slots stores data received from the user, and wherein the interactive agent configuration is specified in an interactive agent configuration tool;
performing an incoming parameter match on parameters passed by a referrer when the passed parameters flag indicates that the incoming parameter match should be performed, wherein the incoming parameter match compares the slot to a parameter name in the parameters, determines a matched value associated with the parameter name, and initializes the input value to the matched value when the matched value is determined;
deploying a first interactive agent to the chat application that presents a first dialog in the plurality of dialogs in the conversation, wherein the first dialog in the plurality of dialogs is determined using a natural language engine that recognizes a user's intent in text entered in the chat application, and wherein the first interactive agent displays the matched value when the matched value is determined;
obtaining an input value from the user in response to the first dialog;
storing the input value in the slot;
determining whether the temporary flag associated with the slot is set; and
upon completion of the first dialog, deploying a second interactive agent to the chat application that presents a second dialog in a second conversation with the user, wherein an availability of the stored input value in the second conversation is based on a determination of whether the temporary flag associated with the slot is set or not set, wherein the passed parameters flag and the temporary flag are set using checkboxes presented in the interactive agent configuration tool prior to deploying the chat application.

14. The non-transitory computer-readable device of claim 13, the operations further comprising:
receiving an updated value as text;
applying natural language processing to the updated value; and
store the updated value in the slot.

15. The non-transitory computer-readable device of claim 13, the operations further comprising:
storing a set of mutually exclusive options for the slot;
receiving an updated value using a graphical control element that allows selection of one of the mutually exclusive options; and
storing the updated value in the slot.

16. The non-transitory computer-readable device of claim 13, the request is a hypertext transfer protocol (HTTP).

17. The non-transitory computer-readable device of claim 13, the operations further comprising:
clearing the input value before deploying the second interactive agent that presents a second dialog to the user when the temporary flag associated with the slot is set.

* * * * *